US009399187B2

(12) United States Patent
Meirav et al.

(10) Patent No.: US 9,399,187 B2
(45) Date of Patent: Jul. 26, 2016

(54) AIR HANDLING SYSTEM WITH INTEGRATED AIR TREATMENT

(71) Applicant: ENVERID SYSTEMS, INC., Houston, TX (US)

(72) Inventors: Udi Meirav, Newton, MA (US); Israel Biran, Avihayil (IL)

(73) Assignee: Enverid Systems, Inc., Needham, MA (US)

( * ) Notice: Subject to any disclaimer, the term of this patent is extended or adjusted under 35 U.S.C. 154(b) by 0 days.

(21) Appl. No.: 14/430,863

(22) PCT Filed: Sep. 24, 2013

(86) PCT No.: PCT/US2013/061422
§ 371 (c)(1),
(2) Date: Mar. 24, 2015

(87) PCT Pub. No.: WO2014/047632
PCT Pub. Date: Mar. 27, 2014

(65) Prior Publication Data
US 2015/0258488 A1 Sep. 17, 2015

Related U.S. Application Data

(60) Provisional application No. 61/704,831, filed on Sep. 24, 2012.

(51) Int. Cl.
*B01D 53/02* (2006.01)
*B01D 53/04* (2006.01)
(Continued)

(52) U.S. Cl.
CPC .......... *B01D 53/0462* (2013.01); *F24F 3/0442* (2013.01); *F24F 3/16* (2013.01);
(Continued)

(58) Field of Classification Search
CPC ............... B01D 2257/302; B01D 2257/404; B01D 2257/502; B01D 2257/504; B01D 2257/708; B01D 2257/93; B01D 2259/4508; B01D 53/0462; F24F 13/00; F24F 13/0442; F24F 13/16
See application file for complete search history.

(56) References Cited

U.S. PATENT DOCUMENTS 1,522,480 A 1/1925 Allen
1,836,301 A 12/1931 Bechtold
(Continued)

FOREIGN PATENT DOCUMENTS

| CA | 2640152 A1 | 4/2010 |
| CN | 2141873 Y | 9/1993 |

(Continued)

OTHER PUBLICATIONS

International Search Report and Written Opinion, mailed Dec. 19, 2013 for PCT International Application No. PCT/US2013/061422.
(Continued)

*Primary Examiner* — Christopher P Jones
(74) *Attorney, Agent, or Firm* — Cooley LLP

(57) ABSTRACT

Embodiments of the present disclosure include methods and systems of circulating air in an enclosed environment. In such embodiments, the system may comprise an air handling unit (AHU), the AHU including an indoor air inlet to receive an indoor airflow from the enclosed environment and an indoor air outlet to expel the indoor airflow, a conditioning element arranged between the inlet and the outlet configured to at least heat or cool the indoor airflow as it flows thereover, one or more fan units arranged between the inlet and the outlet configured to provide velocity to the indoor airflow, and an air treatment assembly (ATA) arranged within or proximate the AHU, the ATA including an air inlet configured to receive a portion of the indoor airflow received by the AHU indoor air inlet.

20 Claims, 9 Drawing Sheets

(51) Int. Cl.
*F24F 3/044* (2006.01)
*F24F 3/16* (2006.01)
*F24F 13/00* (2006.01)

(52) U.S. Cl.
CPC .......... *F24F 13/00* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2257/93* (2013.01); *B01D 2259/4508* (2013.01)

(56) References Cited

U.S. PATENT DOCUMENTS

| | | |
|---|---|---|
| 3,107,641 A | 10/1963 | Haynes |
| 3,511,595 A | 5/1970 | Fuchs |
| 3,619,130 A | 11/1971 | Ventriglio et al. |
| 3,702,049 A | 11/1972 | Morris, Jr. |
| 3,751,848 A | 8/1973 | Ahlstrand |
| 3,808,773 A | 5/1974 | Reyhing et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sircar et al. |
| 4,292,059 A | 9/1981 | Kovach |
| 4,322,394 A | 3/1982 | Mezey et al. |
| 4,325,921 A | 4/1982 | Aiken et al. |
| 4,433,981 A | 2/1984 | Slaugh et al. |
| 4,451,435 A | 5/1984 | Holter et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar |
| 4,810,266 A | 3/1989 | Zinnen et al. |
| 4,892,719 A | 1/1990 | Gesser |
| 4,917,862 A | 4/1990 | Kraw et al. |
| 4,987,952 A | 1/1991 | Beal et al. |
| 5,046,319 A | 9/1991 | Jones |
| 5,087,597 A | 2/1992 | Leal et al. |
| 5,137,548 A | 8/1992 | Grenier et al. |
| 5,186,903 A | 2/1993 | Cornwell |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,464,369 A | 11/1995 | Federspiel |
| 5,492,683 A | 2/1996 | Birbara et al. |
| 5,584,916 A | 12/1996 | Yamashita et al. |
| 5,675,979 A | 10/1997 | Shah |
| 5,702,505 A * | 12/1997 | Izumi ................... B01D 53/06 95/113 |
| 5,707,005 A | 1/1998 | Kettler et al. |
| 5,869,323 A | 2/1999 | Horn |
| 5,876,488 A | 3/1999 | Birbara et al. |
| 5,948,355 A | 9/1999 | Fujishima et al. |
| 5,964,927 A | 10/1999 | Graham et al. |
| 5,984,198 A | 11/1999 | Bennett et al. |
| 6,027,550 A | 2/2000 | Vickery |
| 6,102,793 A | 8/2000 | Hansen |
| 6,113,674 A | 9/2000 | Graham et al. |
| 6,123,617 A | 9/2000 | Johnson |
| 6,187,596 B1 | 2/2001 | Dallas et al. |
| 6,280,691 B1 | 8/2001 | Homeyer et al. |
| 6,364,938 B1 | 4/2002 | Birbara et al. |
| 6,432,367 B1 | 8/2002 | Munk |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Shah et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,891,573 B2 | 2/2011 | Finkam et al. |
| 8,157,892 B2 | 4/2012 | Meirav |
| 8,317,890 B2 | 11/2012 | Raether et al. |
| 8,491,710 B2 | 7/2013 | Meirav |
| 2001/0021363 A1 | 9/2001 | Poles et al. |
| 2001/0054415 A1 * | 12/2001 | Hanai ................ F02M 25/0809 123/520 |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0097086 A1 | 5/2003 | Gura |
| 2003/0188745 A1 | 10/2003 | Deas et al. |
| 2004/0005252 A1 | 1/2004 | Siess |
| 2004/0069144 A1 | 4/2004 | Wegeng et al. |
| 2004/0118287 A1 | 6/2004 | Jaffe et al. |
| 2005/0133196 A1 * | 6/2005 | Gagnon ................... F24D 5/04 165/54 |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0148642 A1 | 7/2006 | Ryu et al. |
| 2006/0249019 A1 | 11/2006 | Roychoudhury et al. |
| 2008/0078289 A1 | 4/2008 | Sergi et al. |
| 2008/0119356 A1 | 5/2008 | Ryu et al. |
| 2008/0127821 A1 | 6/2008 | Noack et al. |
| 2008/0135060 A1 | 6/2008 | Kuo et al. |
| 2008/0182506 A1 | 7/2008 | Jackson et al. |
| 2008/0210768 A1 | 9/2008 | You |
| 2008/0293976 A1 | 11/2008 | Olah et al. |
| 2009/0000621 A1 | 1/2009 | Haggblom et al. |
| 2009/0120288 A1 | 5/2009 | Lackner et al. |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0254868 A1 | 10/2010 | Obee et al. |
| 2010/0262298 A1 | 10/2010 | Johnson et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0198055 A1 | 8/2011 | Meirav et al. |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1 | 11/2011 | Meirav |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |

(56) References Cited

U.S. PATENT DOCUMENTS

| | | |
|---|---|---|
| 2012/0052786 A1 | 3/2012 | Clawsey |
| 2012/0076711 A1 | 3/2012 | Gebald et al. |
| 2012/0148858 A1 | 6/2012 | Wu |
| 2012/0168113 A1 | 7/2012 | Karamanos |
| 2012/0216676 A1 | 8/2012 | Addiego et al. |
| 2012/0222500 A1 | 9/2012 | Riess et al. |
| 2013/0052113 A1 | 2/2013 | Molins et al. |

FOREIGN PATENT DOCUMENTS

| | | |
|---|---|---|
| CN | 101500704 A | 8/2009 |
| CN | 201363833 Y | 12/2009 |
| EP | 0475493 A2 | 3/1992 |
| ES | 2387791 A1 | 10/2012 |
| JP | 56-158126 A | 12/1981 |
| JP | 59-225232 A | 12/1984 |
| JP | 60194243 | 10/1985 |
| JP | 02-092373 A | 3/1990 |
| JP | 09085043 A | 3/1997 |
| JP | 2001-170435 A | 6/2001 |
| JP | 2001232127 A | 8/2001 |
| JP | 3207936 B2 | 9/2001 |
| JP | 2005-090941 A | 4/2005 |
| JP | 2006275487 A | 10/2006 |
| JP | 2009-202137 A | 9/2009 |
| JP | 2010-149086 A | 7/2010 |
| WO | WO 88/05693 A1 | 8/1988 |
| WO | WO 0208160 A1 | 1/2002 |
| WO | WO 0212796 A2 | 2/2002 |
| WO | WO 2007128584 A1 | 11/2007 |
| WO | WO 2008155543 A2 | 12/2008 |
| WO | WO 2009126607 A2 | 10/2009 |
| WO | WO 2010091831 A1 | 8/2010 |
| WO | WO 2010124388 A1 | 11/2010 |
| WO | WO 2011114168 A1 | 9/2011 |
| WO | WO 2011146478 A1 | 11/2011 |
| WO | WO 2012134415 A1 | 10/2012 |
| WO | WO 2012158911 A2 | 11/2012 |

OTHER PUBLICATIONS

Gesser, H.D., "The Reduction of Indoor Formaldehyde Gas and that Emanating from Urea Formaldehyde Foam Insulation (UFFI)", Environmental International, vol. 10, pp. 305-308, 1984.
Jones, Christopher W., "CO2 Capture from Dilute Gases as a Component of Modern Global Carbon Management", Annual Review of Chemical and Biomolecular Engineering, vol. 2, pp. 31-52, 2011.
Ma, Chanjuan et al., "Removal of low-concentration formaldehyde in air by adsorption on activated carbon modified by hexamethylene diamine", Carbon, vol. 49, pp. 2869-2877, 2011.
Nuckols, M. L. et al., "Technical Manual: Design Guidelines for Carbon Dioxide Scrubbers", Naval Coastal Systems Center, vol. 4110, pp. 1-83, Revision A, Jul. 1985.
United States Environmental Protection Agency, "Carbon Adsorption for Control of VOC Emissions: Theory and Full Scale System Performance", vol. 450, pp. 88-012, Jun. 1988.
Serna-Guerrero, Rodrigo et al., "Triamine-grafted pore-expanded mesoporous silica for CO2 capture: Effect of moisture and adsorbent regeneration strategies", Adsorption, vol. 16, pp. 567-575, 2010.
International Search Report and Written Opinion, mailed Sep. 5, 2012 for PCT/US2012/024333.
International Search Report and Written Opinion, mailed Jan. 28, 2013 for PCT/US2012/038343.
International Search Report and Written Opinion, mailed Jul. 25, 2013 for PCT/US2013/035933.
International Search Report and Written Opinion, mailed Dec. 20, 2013 for PCT/US2013/051077.
International Search Report and Written Opinion, mailed Jan. 3, 2014 for PCT/US2013/042239.
International Search Report and Written Opinion, mailed Mar. 22, 2013 for PCT/US2012/065600.
International Search Report and Written Opinion, mailed Mar. 29, 2013 for PCT/US2013/021033.
International Search Report and Written Opinion, mailed Mar. 17, 2014 for PCT/US2013/070383.
International Search Report and Written Opinion, mailed Jul. 10, 2014 for PCT/US2014/023488.
International Search Report and Written Opinion, mailed Aug. 15, 2014 for PCT/US2014/031009.
International Search Report and Written Opinion, mailed Nov. 24, 2014 for PCT/US2014/055863.
International Search Report and Written Opinion, mailed Nov. 24, 2014 for PCT/US2014/056097.
Sidheswaran, Meera A. et al., "Energy efficient indoor VOC air cleaning with activated carbon filter (ACF) filters", Building and Environment, vol. 47, Apr. 2011, pp. 357-367.
Zorflex® ACC, 100% Activated Woven Carbon Cloth, Calgon Carbon Corporation, 2008, www.calgoncarbon.com, 2 pages.
Zorflex® ACC, 100% Activated Woven Carbon Cloth, Calgon Carbon Corporation, 2011, www.calgoncarbon.com, 2 pages.
Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.
International Search Report and Written Opinion, mailed Sep. 27, 2011, for PCT/US2011/036801.
International Preliminary Report on Patentability, mailed Nov. 29, 2012, for PCT/US2011/036801.
"EPA Ventilation and Air Quality in Offices, Fact Sheet" United States Environmental Protection Agency, Air and Radiation (6609J), Revised Jul. 1990.
International Preliminary Report on Patentability, mailed Aug. 22, 2013, for PCT/US2012/024333.
International Preliminary Report on Patentability, mailed Nov. 28, 2013 for PCT/US2012/038343.
International Preliminary Report on Patentability, mailed May 30, 2014 for PCT/US2012/065600.
International Preliminary Report on Patentability, mailed Jul. 24, 2014 for PCT/US2013/021033.
International Preliminary Report on Patentability, mailed Oct. 23, 2014 for PCT/US2013/035933.
International Preliminary Report on Patentability, mailed Dec. 4, 2014 for PCT/US2013/042239.
International Preliminary Report on Patentability, mailed Jan. 29, 2015 for PCT/US2013/051077.
International Preliminary Report on Patentability, mailed Apr. 2, 2015 for PCT/US2013/061422.
International Preliminary Report on Patentability, mailed May 28, 2015 for PCT/US2013/070383.
International Search Report and Written Opinion, mailed Sep. 2, 2014, for PCT/US2014/035114.
International Search Report and Written Opinion, mailed May 15, 2015, for PCT/US2015/015690.
Goeppert et al., "Carbon Dioxide Capture from the Air Using a Polyamine Based Regenerable Solid Adsorbent," J. Am. Chem. Soc., vol. 133, No. 50, Nov. 21, 2011 pp. 20164-20167 entire document.
International Search Report and Written Opinion, mailed May 5, 2014, for PCT/US2014/011078.

* cited by examiner

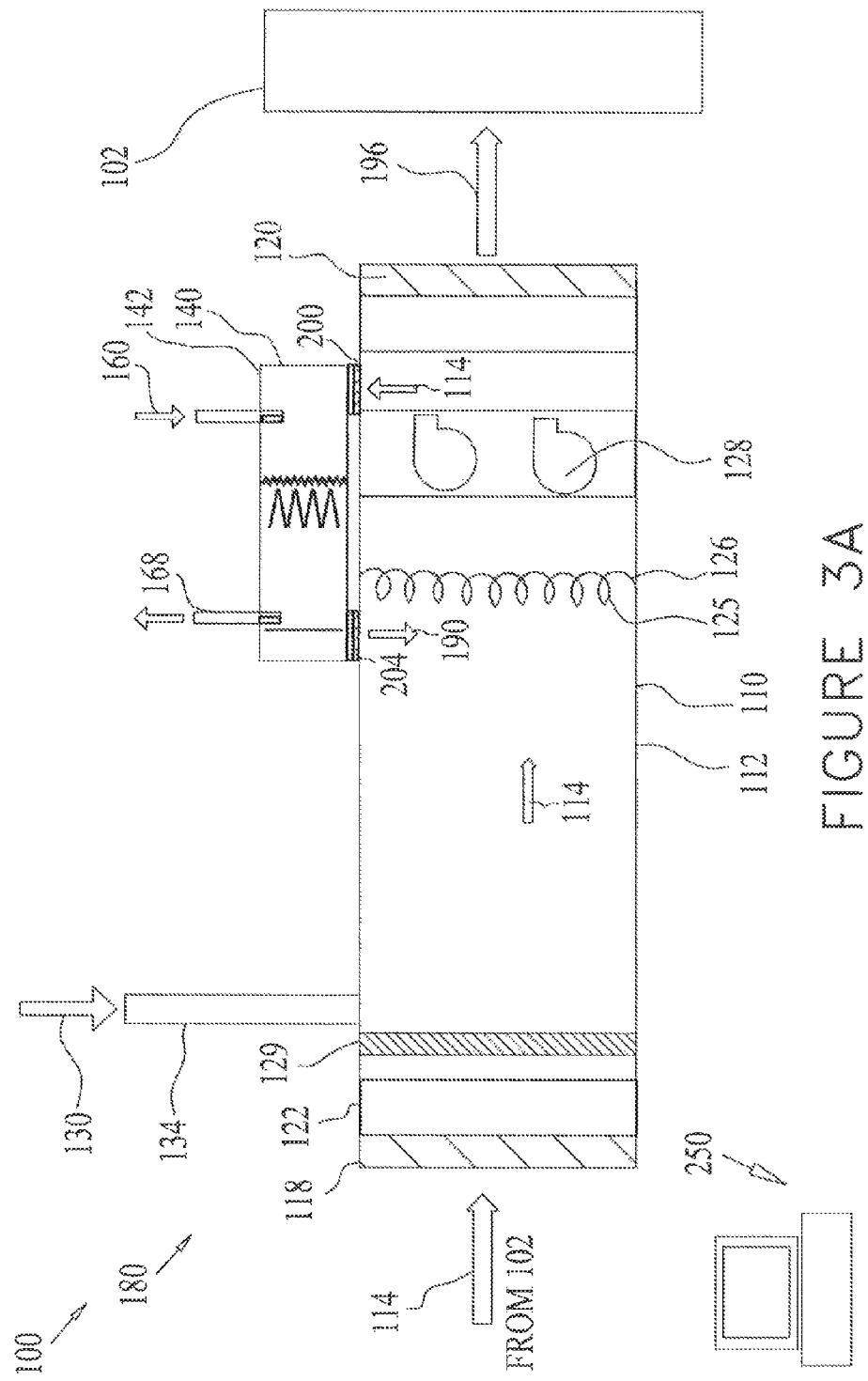

AIR HANDLING SYSTEM WITH INTEGRATED AIR TREATMENT

CROSS REFERENCE TO RELATED APPLICATIONS

This application is a 35 U.S.C. 371 national stage entry of PCT/US2013/061422, which claims priority to U.S. Provisional Patent Application No. 61/704,831, filed Sep. 24, 2012, entitled "Air Handling Systems with Integrated Air Treatment Systems", both disclosures of which are incorporated herein by reference in their entirety.

TECHNICAL FIELD

Embodiments of the present disclosure generally relate to air management systems and particularly to air management systems integrating air treatment assemblies and systems and corresponding methods thereof.

BACKGROUND

Air management systems including Heating, Ventilation and Air-Conditioning ("HVAC") are common in modern enclosed spaces, such as inter alia a building, vehicle or vessel. One of the goals of HVAC systems is to provide a comfortable and healthy environment for the enclosed space occupants, in terms of temperature, humidity, composition and cleanliness of the indoor air. Additionally, HVAC systems allow control of the substance concentration for maintaining the indoor air at a desired degree, thereby ensuring good air quality.

Air management systems typically comprise Air Handling Units (AHU). The AHU supplies conditioned air to various locations in the enclosed space, using fans and dampers to manage airflow while bringing the air into contact with coils, screens, and other media. Some air handling systems are supplied with chilled or warmed fluid from a separate, possibly remote chiller or heater, whereas some air handling units or handlers are integrated with a dedicated chiller or heater; the latter are sometimes referred to as "packaged units" (PU). In most HVAC installations, air circulates in the enclosed space, in other words conditioned air ("supply air", or SA) is delivered to the enclosed space from one or more AHUs, typically through a network of ducts or conduits, and indoor, return air (RA) also flows back from the enclosed space to the AHU through separate ducts or channels, where it is reconditioned and circulate back to the enclosed space.

Indoor air within and around enclosed spaces is affected by a plurality of substances, comprising contaminants or pollutants. Among these contaminants are gaseous contaminants, such as carbon dioxide ($CO_2$), carbon monoxide, nitrous oxides, sulfur oxides and radon and other inorganic gases as well as a broad class of organic gases and vapors, referred to as Volatile Organic Compounds (VOCs). Particles and microorganisms also represent non-gaseous contaminants that affect indoor air quality and should be filtered or removed. These contaminants are often generated inside the building by its occupants, systems and content. In order to maintain good air quality, HVAC systems are typically configured to replace indoor air with outdoor air or, alternatively, to allow the air to flow through air scrubbers. Outdoor air may be air from out of the enclosed space.

SUMMARY OF DISCLOSURE

According to some embodiments in order to maintain good air quality, HVAC systems are provided and configured to replace indoor air with outdoor air or, alternatively, to allow the indoor air (and/or outdoor air) to flow through air scrubbers to remove contaminants. Outdoor air may comprise air from outside of the enclosed space.

In some embodiments, adsorbent based scrubbers may be used for extended periods of time to scrub indoor air by undergoing a repeated cycle of adsorption and regeneration. This cycle may also be referred to as a temperature-swing or concentration-swing adsorption and regeneration cycle. Normally, once a sorbent, i.e., an adsorbent material, becomes saturated with contaminants, it loses its adsorption capacity. Regeneration may be achieved under appropriate conditions where the contaminants that have been captured by the adsorbent material are released and purged, allowing the adsorbent material to regain its adsorptive properties. In some embodiments, in-situ regeneration, namely without having to move the adsorbent material or parts of the scrubber, can be facilitated by a combination of heat and a flow of a relatively clean purging gas, which can be outdoor air, for example.

According to some embodiments of the present disclosure, systems that benefit from scrubbing indoor air may be achieved more efficiently and economically by combining an Air Treatment assembly (ATA) with the AHU as a single integrated product for efficient and economical manufacturing and installation. The ATA provides improved air quality by virtue of the elimination of unwanted gases, like carbon dioxide ($CO_2$) and volatile organic compounds (VOCs). The advantages of the integrated configuration and manufacture include, inter alia, reduction in size and cost, simplified installation, utilization of shared components, and greater energy efficiencies.

In some embodiments of the present disclosure, systems and methods are described for circulating air in an enclosed environment (i.e., enclosed space), comprising an AHU, the AHU includes an indoor air inlet to receive an indoor airflow from the enclosed environment and an indoor air outlet to expel the indoor airflow, a conditioning element arranged between the inlet and the outlet configured to at least heat or cool the indoor airflow as it flows thereover, one or more fan units arranged between the inlet and the outlet configured to provide velocity to the indoor airflow, and an ATA arranged within or proximate the AHU, the ATA including an air inlet configured to receive a portion of the indoor airflow received by the AHU indoor air inlet, a regenerable adsorbent material configured to treat the received indoor airflow by adsorbing at least one gaseous contaminant contained in the received indoor airflow, and an outlet for expelling the air treated by the adsorbent material back into the AHU.

In accordance with some embodiments, the ATA includes an outdoor air inlet and an outdoor air outlet. The AHU may include an outdoor air inlet. In accordance with some embodiments, the ATA inlet and ATA outlet are arranged downstream from the conditioning element. The one or more fans may be located downstream from the conditioning element, the ATA inlet may be arranged downstream from the AHU inlet, and the ATA outlet may be arranged downstream from the ATA inlet and upstream from the conditioning element.

In accordance with some embodiments, the one or more fans may be located downstream from the conditioning element, the ATA inlet may be arranged downstream from the one or more fans, and the ATA outlet may be arranged downstream from the ATA inlet.

In accordance with some embodiments, the one or more fans may be located downstream from the conditioning element, the ATA outlet may be arranged downstream from the AHU inlet and upstream from the conditioning element, and the ATA inlet may be arranged downstream from the ATA outlet and downstream from the one or more fans.

In accordance with some embodiments, the one or more fans may be located downstream from the conditioning element, the ATA outlet may be arranged upstream from the conditioning element, and the ATA inlet may be arranged downstream from the conditioning element and upstream from the one or more fans.

In accordance with some embodiments, the conditioning element may be configured to receive the indoor airflow for cooling thereof prior to entering the ATA inlet.

The indoor air may flow through the conditioning element prior to entering the ATA inlet and following exiting the ATA outlet the indoor air flows again through the conditioning element. The ATA inlet may be arranged upstream from the one or more fans.

In accordance with some embodiments, the one or more fans may be located downstream from the conditioning element, the ATA outlet may be arranged upstream from the one or more fans and the ATA inlet may be arranged downstream from the one or more fans.

In accordance with some embodiments, the one or more fan units may be configured to direct indoor airflow into the ATA without requiring a booster fan associated with the ATA.

In accordance with some embodiments, the one or more fans may be located downstream from the conditioning element, the ATA outlet may be arranged upstream from the conditioning element and the ATA inlet may be arranged downstream from the one or more fans.

In accordance with some embodiments, the AHU may include a first housing and the ATA includes a second housing. The second housing may be arranged within the first housing or the second housing may be arranged outside the first housing.

In accordance with some embodiments, the adsorbent material may be contained within a cartridge configured to be removable from the ATA.

In accordance with some embodiments, a purging airflow may be directed to the ATA to regenerate the adsorbent material.

In accordance with some embodiments, the ATA may include a purging airflow inlet and a purging airflow outlet, configured to direct a purging airflow over and/or through the adsorbent material to release gaseous contaminants previously adsorbed by the adsorbent material to regenerate the adsorbent material.

In accordance with some embodiments, the purging airflow comprises outdoor air. The purging airflow may either directly or indirectly be heated by at least one of, a heat pump, a gas furnace, solar heat, an electrical coil, and hot water.

In accordance with some embodiments, the AHU may comprise a condenser and the purging airflow is either directly or indirectly heated by the condenser.

In accordance with some embodiments, the gaseous contaminant comprises $CO_2$ or VOCs.

In accordance with some embodiments, the adsorbent materials comprises at least one of: activated carbon, carbon particles, solid supported amine, molecular sieves, porous silica, porous alumina, carbon fibers, metal organic frameworks, porous polymers and polymer fibers.

In accordance with some embodiments, the system may further comprise a central air conditioning system (CACS) having a heat pump or compressor, wherein the AHU comprises a part of the CACS.

In accordance with some embodiments, the system may further comprise a controller, the controller may be configured to control the operation of the system between at least a scrubbing mode, wherein gaseous contaminants contained within the indoor airflow are adsorbed by the adsorbent material, and a regeneration mode, wherein a purging airflow is directed over and/or through the adsorbent material to release gaseous contaminants previously adsorbed by the adsorbent material.

In accordance with some embodiments, the system may further comprise computer instructions operational on the controller to cause the controller to control operation of at least the scrubbing mode and the regeneration mode.

In some embodiments of the present disclosure methods are described for circulating air in an enclosed environment, comprising providing an air management system for circulating air in an enclosed environment, the system comprising, the AHU, the AHU including an indoor air inlet to receive an indoor airflow from the enclosed environment and an indoor air outlet to expel the indoor airflow, a conditioning element arranged between the inlet and the outlet configured to at least heat or cool the indoor airflow as it flows thereover, one or more fan units arranged between the inlet and the outlet configured to provide velocity to the indoor airflow; and an ATA arranged within or proximate the AHU, the ATA including an air inlet configured to intercept a portion of the indoor airflow received by the AHU indoor air inlet, a regenerable adsorbent material configured to treat the intercepted indoor airflow by adsorbing at least one gaseous contaminant contained in the intercepted indoor airflow, and an outlet for expelling the intercepted indoor airflow treated by the adsorbent material, and directing an indoor airflow to the indoor air inlet of the AHU, during a scrubbing cycle, receiving a portion of the indoor airflow received by the indoor air inlet of the AHU and directing the intercepted indoor airflow to the inlet of the ATA, flowing the intercepted indoor airflow over and/or through the adsorbent material to adsorb the at least one gaseous contaminant, directing the treated intercepted indoor airflow to the outlet of the ATA, during a regeneration cycle, directing a purging airflow to the ATA, and flowing the purging airflow over and/or through the adsorbent material to release the gaseous contaminant previously adsorbed by the adsorbent material, so as to regenerate the adsorbent material.

In some embodiments of the present disclosure, a non-transitory computer readable medium having stored thereon computer instructions operational on a computer processor which controls a system for performing a method for circulating and/or scrubbing air in an enclosed environment, is provided. The method comprises directing an indoor airflow to an indoor air inlet of an AHU, the AHU including the indoor air inlet to receive an indoor airflow from the enclosed environment and an indoor air outlet to expel the indoor airflow, during a scrubbing cycle, intercepting a portion of the indoor airflow received by the indoor air inlet of the AHU and directing the intercepted indoor airflow to an air inlet of an ATA arranged proximate the AHU, the ATA including the air inlet configured to intercept a portion of the indoor airflow received by the AHU indoor air inlet, a regenerable adsorbent material configured to treat the intercepted indoor airflow by adsorbing at least one gaseous contaminant contained in the intercepted indoor airflow, and an outlet for expelling the intercepted indoor airflow treated by the adsorbent material, flowing the intercepted indoor airflow over and/or through the adsorbent material to adsorb the at least one gaseous contaminant, directing the treated, intercepted indoor airflow to the outlet of the ATA, during a regeneration cycle, directing a purging airflow to the ATA and flowing the purging airflow over and/or through the adsorbent material to release the gaseous contaminant previously adsorbed by the adsorbent material, so as to regenerate the adsorbent material.

In some embodiments of the present disclosure, a method for circulating air in an enclosed environment is described, the method comprising providing an air management system for circulating air in an enclosed environment, the system comprising an AHU, the AHU including an indoor air inlet to receive an indoor airflow from the enclosed environment and an indoor air outlet to expel the indoor airflow, a conditioning element arranged between the inlet and the outlet configured to at least heat or cool the indoor airflow as it flows thereover, one or more fan units arranged between the inlet and the outlet configured to provide velocity to the indoor airflow and the ATA arranged within or proximate the AHU. The ATA may include an air inlet configured to receive a portion of the indoor airflow, a regenerable adsorbent material configured to treat the intercepted indoor airflow by adsorbing at least one gaseous contaminant contained in the intercepted indoor airflow, and an outlet for expelling the intercepted indoor airflow treated by the adsorbent material and directing the indoor airflow to the indoor air inlet of the AHU, cooling the indoor airflow by directing the indoor airflow to flow from the inlet of the AHU, over the conditioning element, during a scrubbing cycle, receiving a portion of the cooled indoor airflow received by the indoor air inlet of the AHU and directing the intercepted indoor airflow to the inlet of the ATA, flowing the intercepted indoor airflow over and/or through the adsorbent material to adsorb the at least one gaseous contaminant, directing the treated intercepted indoor airflow to the outlet of the ATA, cooling the indoor airflow again by directing the indoor airflow to flow from the outlet of the ATA over the conditioning element. During a regeneration cycle, directing a purging airflow to the ATA and flowing the purging airflow over and/or through the adsorbent material to release the gaseous contaminant previously adsorbed by the adsorbent material, so as to regenerate the adsorbent material.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

FIGS. 3A-3C are each a schematic illustration of an air management system comprising an air treatment assembly according to another embodiment of the present disclosure.

DETAILED DESCRIPTION

Figure 1A:
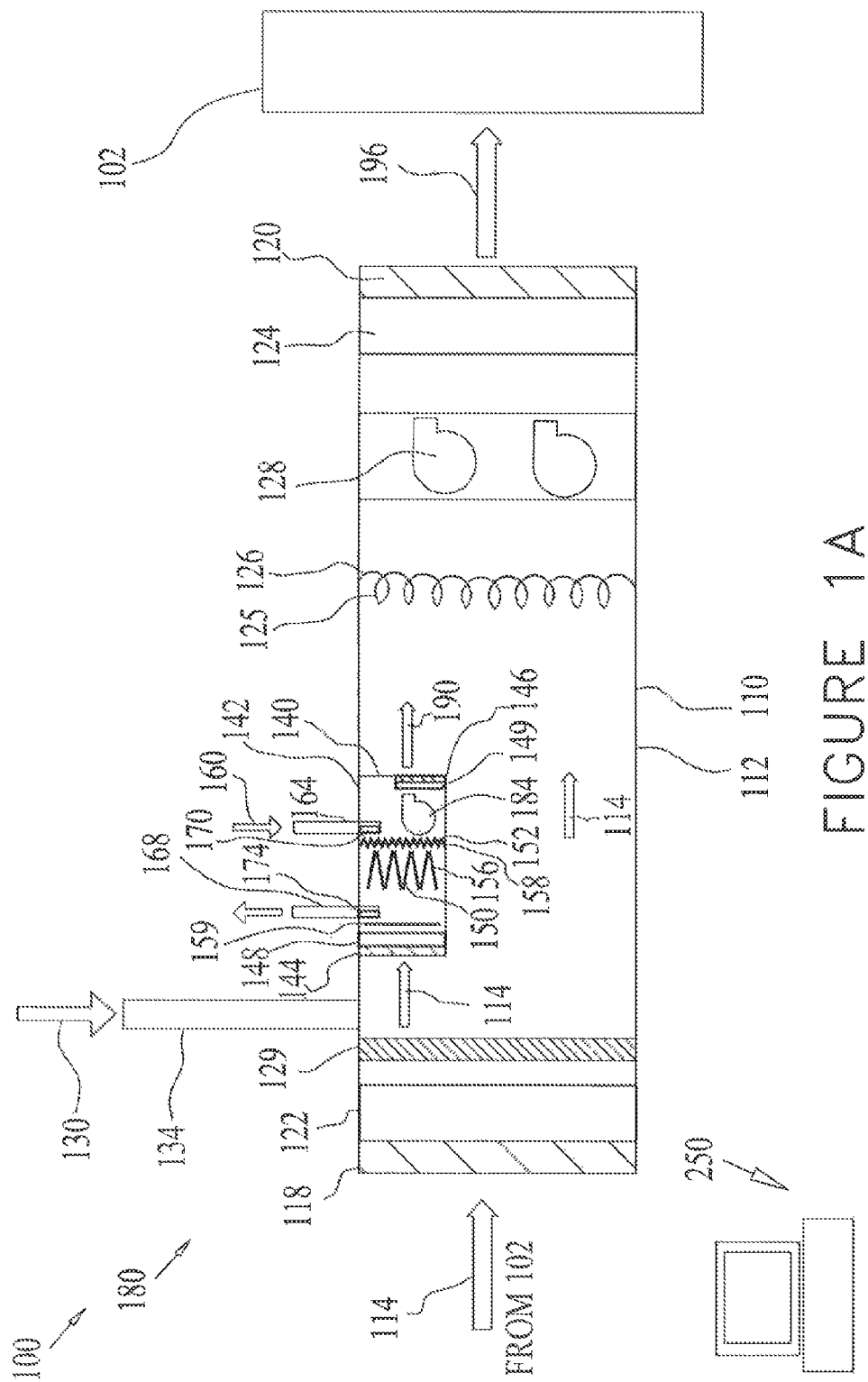
FIGS. 1A and 1B are each a schematic illustration of an air management system comprising an air treatment assembly according to an embodiment of the present disclosure.

FIGS. 1A-4 are each a schematic illustration of an air management system 100 comprising an ATA 140, according to some embodiments of the present disclosure. The air management system 100 includes an air circulation system such as an HVAC system provided to manage and circulate the indoor air within an enclosed environment 102.

The enclosed environment 102 may comprise a commercial environment or building; an office building; a residential environment or building; a house; a school; a factory; a hospital; a store; a mall; an indoor entertainment venue; a storage facility; a laboratory; a vehicle; a vessel including an aircraft, a ship, a sea vessel or the cabin of a sea vessel; a bus; a theatre; a partially and/or fully enclosed arena; an education facility; a library; and/or other partially and/or fully enclosed structure and/or facility which can be at times occupied by equipment, materials, live occupants (e.g., humans, animals, synthetic organisms, etc.), etc., and/or any combination thereof. In some embodiments, the enclosed space 102 may have access to outdoor air 130.

The HVAC system may comprise a standard AHU 110 supplying air to the enclosed environment 102. The AHU 110 may include a first housing 112. Within first housing 112 there may be provided any suitable configuration for selectively adjusting properties of air introduced therein, such as temperature and humidity, for example. Return air, which is indoor air 114 flowing from the enclosed environment 102, may flow therefrom via conduits or ducts (not shown). The return, indoor air 114 typically comprises a relatively higher concentration of unwanted contaminants than desired for maintaining good air quality within the indoor air of the enclosed environment 102.

In accordance with some embodiments, the indoor air 114 may be partially exhausted into the outside atmosphere, or any other environment in any suitable manner, such as via exhaust outlets (not shown). The indoor air 114 may be partially or fully recirculated into the enclosed environment 102. In some embodiments, prior to entering the enclosed environment 102, the indoor air 114 may flow into the AHU 110 via an indoor air inlet 118 provided to receive the indoor airflow. The AHU 110 may comprise an indoor air outlet 120 to expel the indoor airflow thereout. An indoor air inlet damper 122 may be provided to control the volume of incoming indoor air 114 and an indoor air outlet damper 124 may be provided to control the volume of the indoor airflow expelled from the AHU 110.

In some embodiments the indoor air 114 may flow to another section of the HVAC system, such as ducts, a plenum or a manifold (not shown) in the vicinity of the enclosed environment 102.

The AHU 110 may comprise a conditioning element 125 configured to heat or cool the indoor airflow as it flows thereover, such as a single or a plurality of cooling and/or heating coils 126. The conditioning element 125 may be arranged between the indoor air inlet 118 and the indoor air outlet 120. In some embodiments, the AHU 110 may further comprise one or more fan units 128 arranged between the indoor air inlet 118 and the indoor air outlet 120. The fan unit 128 may be configured to provide velocity to the indoor airflow. The AHU 110 may further comprise one or more filters 129 for removing undesired substances, such as dust, from the incoming indoor air 114.

In some embodiments a portion of outdoor air or namely "makeup air" 130 may be introduced into the enclosed environment 102 for supplying nominally fresh, good quality air combining with the return air 114. The outdoor air 130 may enter the AHU 110 via ducts or an outdoor air inlet 134 for heating or cooling and/or humidity adjustment thereof, prior to introduction into the enclosed environment 102.

In some embodiments the ATA 140 may be provided to reduce the concentration of contaminants contained in the airflow introduced therein. In some embodiments, the ATA 140 may comprise a second housing 142 within the AHU or adjacent to it.

The indoor air 114 may flow into the ATA 140 via an indoor air inlet 144 and may exit the ATA 140 via an indoor air outlet 146. An indoor air inlet damper 148 may be provided to control the volume of incoming indoor air 114 and an indoor air outlet damper 149 may be provided to control the volume of the indoor airflow expelled from the ATA 140 into the AHU 110.

In accordance with some embodiments, the ATA 140 may be configured to intercept and receive only a portion of the indoor air 114 flowing within the AHU 110. In some embodiments, between approximately 1% to approximately 50% of the indoor airflow 114 may be diverted to the ATA 140, and a remainder of the indoor air 114 can bypass the ATA 140. In some embodiments, between approximately 3% to approximately 25% of the indoor airflow 114 may be diverted to the ATA 140, and a remainder of the indoor air 114 may bypass the ATA 140. In some embodiments, between approximately 5% to approximately 15% of the indoor airflow 114 can be diverted to the ATA 140, and a remainder of the indoor air 114 can bypass the ATA 140.

Within second housing 142 there may be provided a $CO_2$ sorbent section 150 configured to scrub $CO_2$ from the indoor air 114 and/or a VOC sorbent section 152 configured to scrub VOCs from the indoor air 114. The sorbent including adsorbent materials may also be considered and referred to as scrubbers. Examples of adsorbent material based scrubbers are disclosed in applicant's U.S. Pat. Nos. 8,157,892 and 8,491,710, which are incorporated herein by reference in their entirety. The scrubbers may comprise any suitable material for capturing undesired contaminants from the indoor air 114 flowing therein. For example, the scrubber may comprise an adsorbent material including a solid support supporting an amine-based compound, such as disclosed in applicant's PCT application PCT/US12/38343, which is incorporated herein by reference in its entirety.

Adsorbent materials may also include, but are not limited to, clays, molecular sieves, zeolites, various forms of silica and alumina, porous silica, porous alumina, various forms of carbon, activated carbon, carbon fibers, carbon particles, titanium oxide, porous polymers, polymer fibers and metal organic frameworks.

Adsorbent materials selective to VOCs may also include, but are not limited to molecular sieves, activated carbon, zeolites, carbon fibers and carbon particles, for example. In some embodiments more than one type of adsorbent material is used.

The $CO_2$ adsorbent section 150 may include a plurality of scrubbing cartridges 156 arranged in any suitable arrangement. For example, the scrubbing cartridges 156 may be parallel plates or arranged in a v-bank formation. This staggered arrangement allows substantially parallel airflow paths of the indoor air 114 through the plurality of the scrubbing cartridges 156.

The VOC sorbent section 152 may include one or more VOC scrubbing cartridges 158 arranged in any suitable arrangement. For example, the VOC scrubbing cartridges may be parallel plates or arranged in a v-bank formation. This staggered arrangement allows substantially parallel airflow paths of the indoor air 114 through the plurality of the VOC scrubbing cartridges 158. In some embodiments the VOC cartridge 158 has a pleated or folded configuration to increase surface area. In some embodiments the cartridges 156 or 158 may be configured to be removable from the ATA 140 and may also be replaceable.

Exemplary scrubbing cartridges and modules are disclosed in applicant's US Patent Publication No. 20110198055, which is incorporated herein by reference in its entirety.

Additional air treatment functionalities 159 may be employed for removing other contaminates from the indoor air 114. In some embodiments, the ATA 140 may comprise any thin permeable sheet structure, carbon fibers or particles attached to a sheet of some other permeable material such as paper, cloth or fine mesh, for example.

In some embodiments, the ATA 140 may include catalysts that cause change or decomposition of certain molecules, such as, for example, VOCs or ozone. Such catalysts may include, but are not limited to, any of a number of metal oxides or porous heavy metals. In some embodiments, the ATA 140 may include plasma or ionizers that generate ions, which in turn can serve to eliminate VOCs or microorganisms. Similarly, ultraviolet radiation can be employed to destroy microorganisms or activate certain catalytic processes.

The ATA 140 may operate in a cycle comprising an adsorption phase and a regeneration phase.

In the adsorption phase the contaminants are captured and adsorbed by the adsorbent materials or any other means.

Following the capture of the contaminants in the adsorption phase, the adsorbent material may be regenerated during the regeneration phase by urging the release of the contaminants therefrom. The regeneration may be performed in any suitable manner. In some embodiments, regeneration may be performed by streaming a purge gas through the adsorbent material for release of at least a portion of the contaminants therefrom. The purge gas may comprise outdoor air 160. The outdoor air 160 or any purge gas may flow into the ATA 140 via an outdoor air inlet 164 (i.e. a purging airflow inlet) and may exit the ATA 140 via an outdoor air outlet 168 (i.e. a purging airflow outlet). An outdoor air inlet damper 170 may be provided to control the volume of incoming outdoor air 160 and an outdoor air outlet damper 174 may be provided to control the volume of the outdoor airflow expelled from the ATA 140.

In accordance with some embodiment, the ATA 140 and the AHU 110 may be configured and assembled as a single integrated system 180 in any suitable manner. The ATA 140 may be placed in proximity to the AHU 110. In some embodiments the second ATA housing 142 may be arranged within the first housing 112 of the AHU 110, as seen FIG. 1A. In some embodiments, the second ATA housing 142 may be arranged outside the first housing 112 and mounted or attached thereon, beside or above the AHU housing, as seen in FIGS. 1B-4.

The integrated system 180 may be configured with the components of the AHU 110 and ATA 140. The integrated system 180 may be reduced in size and cost and may be easily installed within an air management system 100, as opposed to two separate units—the AHU 110 and ATA 140. Additionally, in some embodiments, the components of the AHU 110 may be utilized to operate the ATA 140, thereby improving the efficiency of the adsorption of contaminants from the indoor air, as will be further described in reference to FIGS. 1A-4.

There are several topological choices regarding the airflow patterns which relate to the overall configuration of the integrated system 180 and may be addressed when configuring the integrated system 180 and selecting its components. In some embodiments, one consideration may include the placement of the ATA indoor air inlet 144 relative to the components within the AHU housing 112 (e.g. the filter 129, conditioning element 125 and fan units 128).

The indoor air inlet 144 may be referred to as an intake point or simply "intake" and the indoor air 114 flowing therein may be referred to as "intake air". In some embodiments, one consideration may include the placement of the ATA indoor air outlet 146 relative to the components within the AHU housing 112. The indoor air outlet 146 may be referred to as a feed point or simply "feed" and air flowing thereout may be referred to as "feed air".

In the following exemplary embodiments of FIGS. 1A-4, configurations are illustrated in the case of an integrated system 180 where the fans units 128 are downstream the conditioning element 125, namely operating in a "pull" mode. It is appreciated that the integrated system 180 may be configured with fan units 128 operating in a "push" mode, i.e. where the fans units 128 are upstream the conditioning element 125.

It is noted that in the description herein the term "downstream" refers to the direction of the airflow from the AHU indoor air inlet 118 to the AHU indoor air outlet 120.

In the following description of FIGS. 1A-4 a "forward topology" refers to an airflow pattern where the intake 144 is upstream from the feed 146, parallel to the airflow direction of indoor air 114 flowing from the AHU indoor air inlet 118 to the AHU indoor air outlet 120. A "reverse topology" refers to where the intake 144 is downstream from the Feed 146, opposite to the airflow direction of indoor air 114 from the AHU indoor air outlet 120 to the AHU indoor air inlet 118.

Figure 1B:
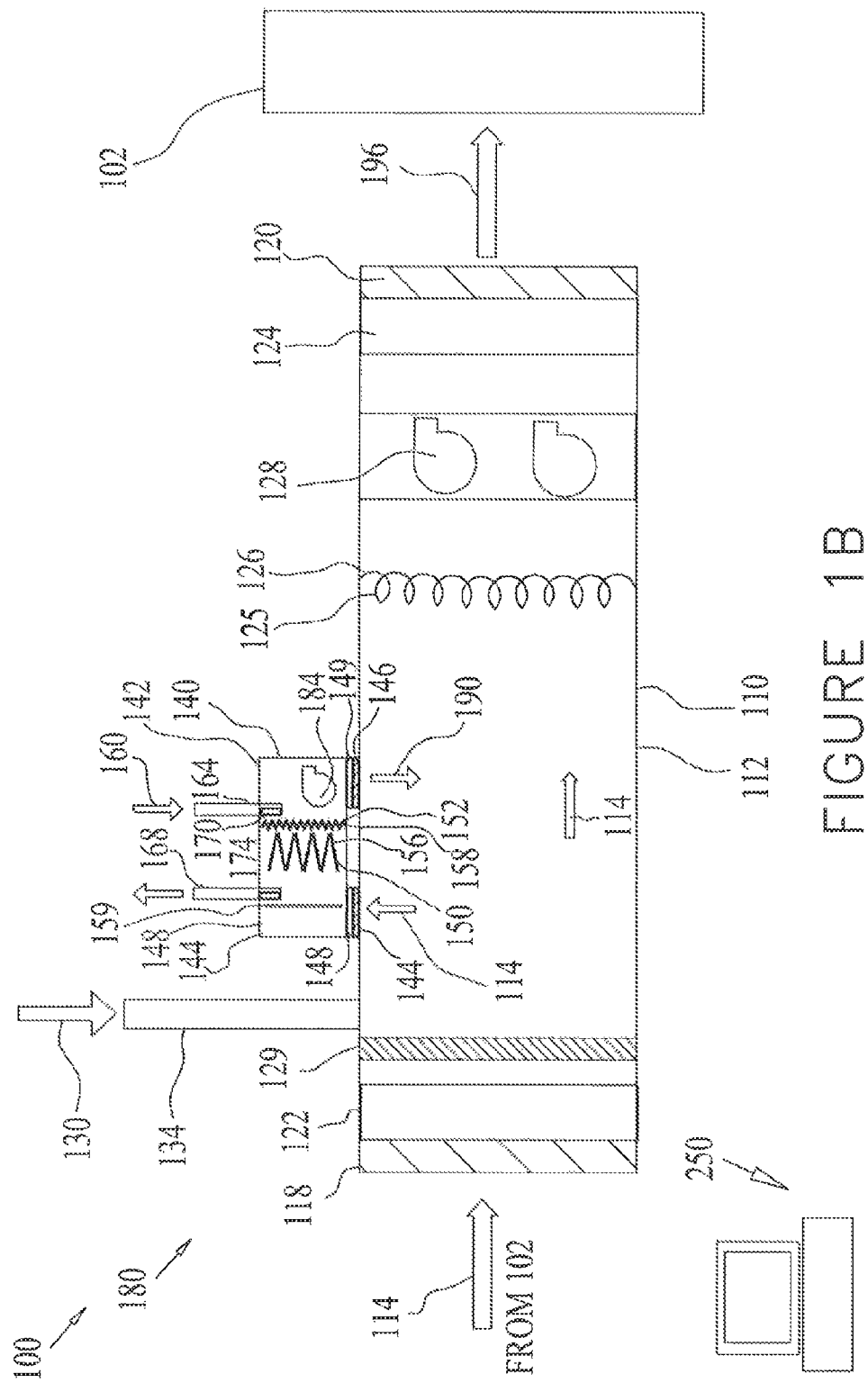

In FIGS. 1A and 1B, the integrated system 180 is configured with a forward topology where the intake 144 and feed 146 are illustrated upstream from the conditioning element 125 of the AHU 110. The difference between these two embodiments is the mechanical layout, where in FIG. 1A the ATA 140 is placed within the housing 112 of the AHU 110 and in FIG. 1B the ATA 140 is mounted on the housing 112 of the AHU 110.

According to some embodiments, as shown in FIGS. 1A and 1B, during the adsorption phase of the integrated system 180, indoor air 114 may be directed to flow into the AHU 110 of the integrated system 180, via the indoor air inlet 118 and indoor air inlet damper 122, which is positioned in an open state. The fan unit 128 of the AHU 110 may direct the indoor air 114 to flow therethrough. The indoor air 114 may be directed to flow through the filter 129.

In some embodiments, the ATA 140 may comprise an ATA fan 184, or an array of fans, provided to direct the portion of the indoor air 114 to flow into the ATA 140, via the intake 144 and indoor air inlet damper 148. The indoor air inlet damper 148 may be positioned in an open state. The indoor air 114 may be directed to flow through the $CO_2$ sorbent section 150 and/or the VOC sorbent section 152 or any other air treatment functionalities 159.

The now treated air 190 may be directed to flow out of the ATA 140 via the feed 146 and indoor air outlet damper 149, which may be positioned in an open state. The treated air 190 combined with the untreated indoor air 114 and/or the outdoor makeup air 130 (when provided) may be directed to flow through the AHU 110 and may be conditioned (e.g. cooled or heated) by conditioning element 125. The combined air may be directed to exit the AHU 110 of the integrated system 180 via the AHU indoor air outlet 120 and the indoor air outlet damper 124, which may be positioned in an open state. The combined air is thereafter introduced into the enclosed environment 102 as supply air 196.

During a regeneration phase, the purge gas, e.g., outdoor air 160, may flow into the integrated system 180, via the ATA outdoor air inlet 164 and outdoor air inlet damper 170, which may be positioned in an open state, while the ATA indoor air inlet damper 148 and indoor air outlet damper 149 may be generally closed.

The outdoor air 160 may be provided to the ATA 140 in any suitable manner. For example, wherein the integrated system 180 comprises an AHU 110 configured as a rooftop unit, the outdoor air 160 may flow in from the ambient environment. Wherein the integrated system 180 comprises an AHU 110 placed in a closed machine room or without direct contact with the outdoor ambient environment, the outdoor air 160 may flow from a conduit (not shown) configured to provide outdoor air 160 to the integrated system 180. Additionally, outdoor air 160 may be provided to the integrated system 180 from other locations in the enclosed environment 102, such as via an enclosed environment pier.

The outdoor air 160 may flow during the regeneration phase from outdoor air inlet 164 to outdoor air outlet 168, which is the opposite direction of the indoor air flow during the adsorption phase, i.e. from intake 144 to feed 146. Alternatively, the outdoor air 160 may flow during the regeneration phase from outdoor air outlet 168 to indoor air inlet 164, which is the same direction of the indoor airflow during the adsorption phase, i.e. from intake 144 to feed 146.

In some embodiments, the adsorbent material and/or the outdoor air 160 may be heated prior to regeneration of the ATA 140, typically within a range of approximately 20-120° C. Alternatively, the adsorbent material and/or outdoor air 160 may be heated to a temperature less than 80° C. Alternatively, the adsorbent material and/or outdoor air 160 may be heated to a temperature less than 50° C. Alternatively, the adsorbent material and/or outdoor air 160 may enter the ATA 140 at the ambient temperature.

In accordance with one embodiment, outdoor air 160 is directly or indirectly heated by at least one of, a heat pump, a gas furnace, solar heat, an, heated fluid coil, an electrical coil or hot water provided from outside or inside the air management system 100. Alternatively, the outdoor air 160 may be directly or indirectly heated by the condenser of the same heat pump that provides refrigerant for the air management system 100 or the AHU 110.

Figure 4:
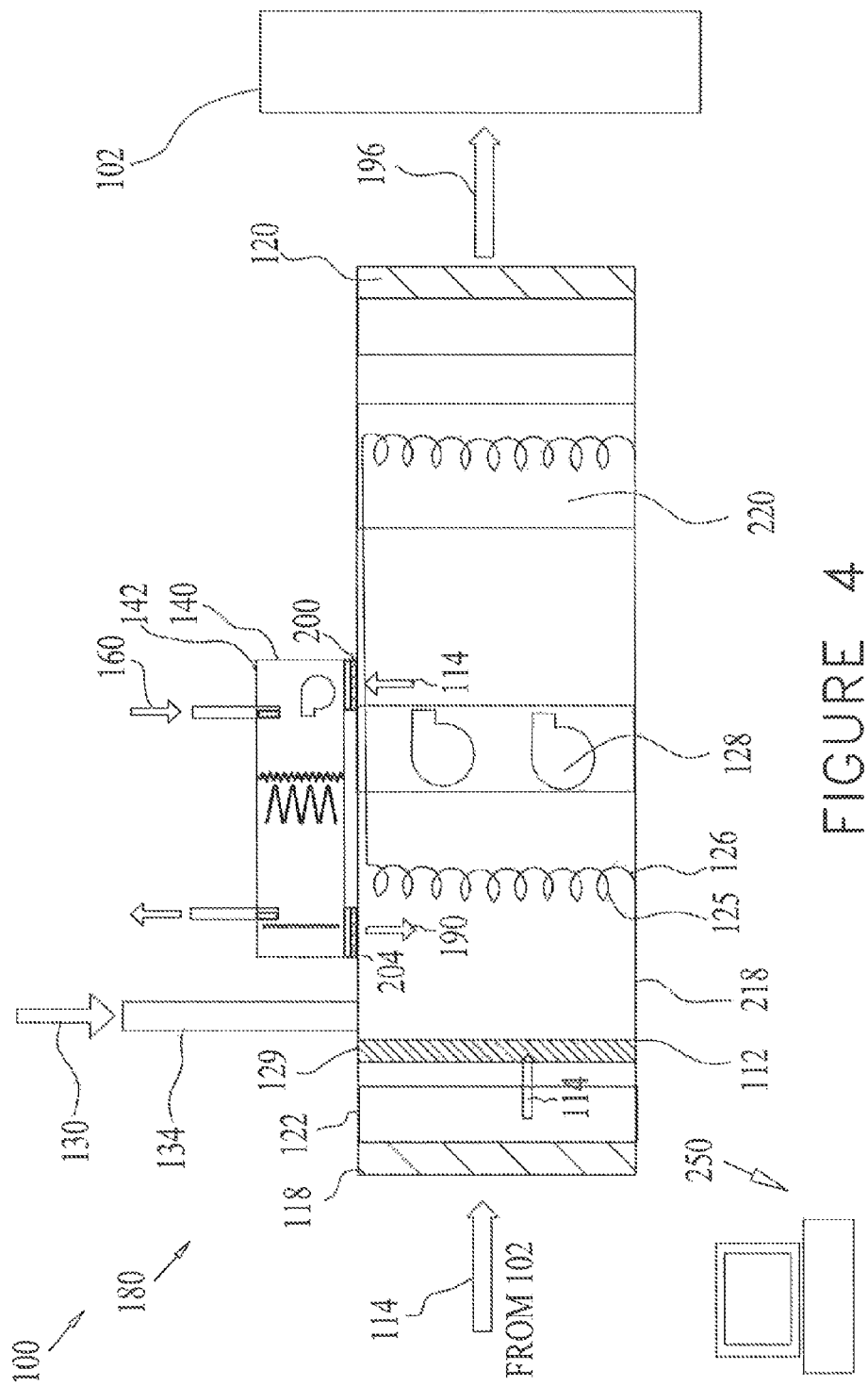
FIG. 4 is a schematic illustration of an air management system comprising an air treatment assembly according to another embodiment of the present disclosure.

In accordance with another embodiment, such as in the case of an integrated system 180 comprising an AHU 110 configured as a packaged unit (PU), as seen in FIG. 4, or configured as an AHU 110 with a nearby chiller, the outdoor air 160 may be heated directly or indirectly by heat emitted from the condenser or radiator, thereby capturing and utilizing "waste heat".

Figure 2A:
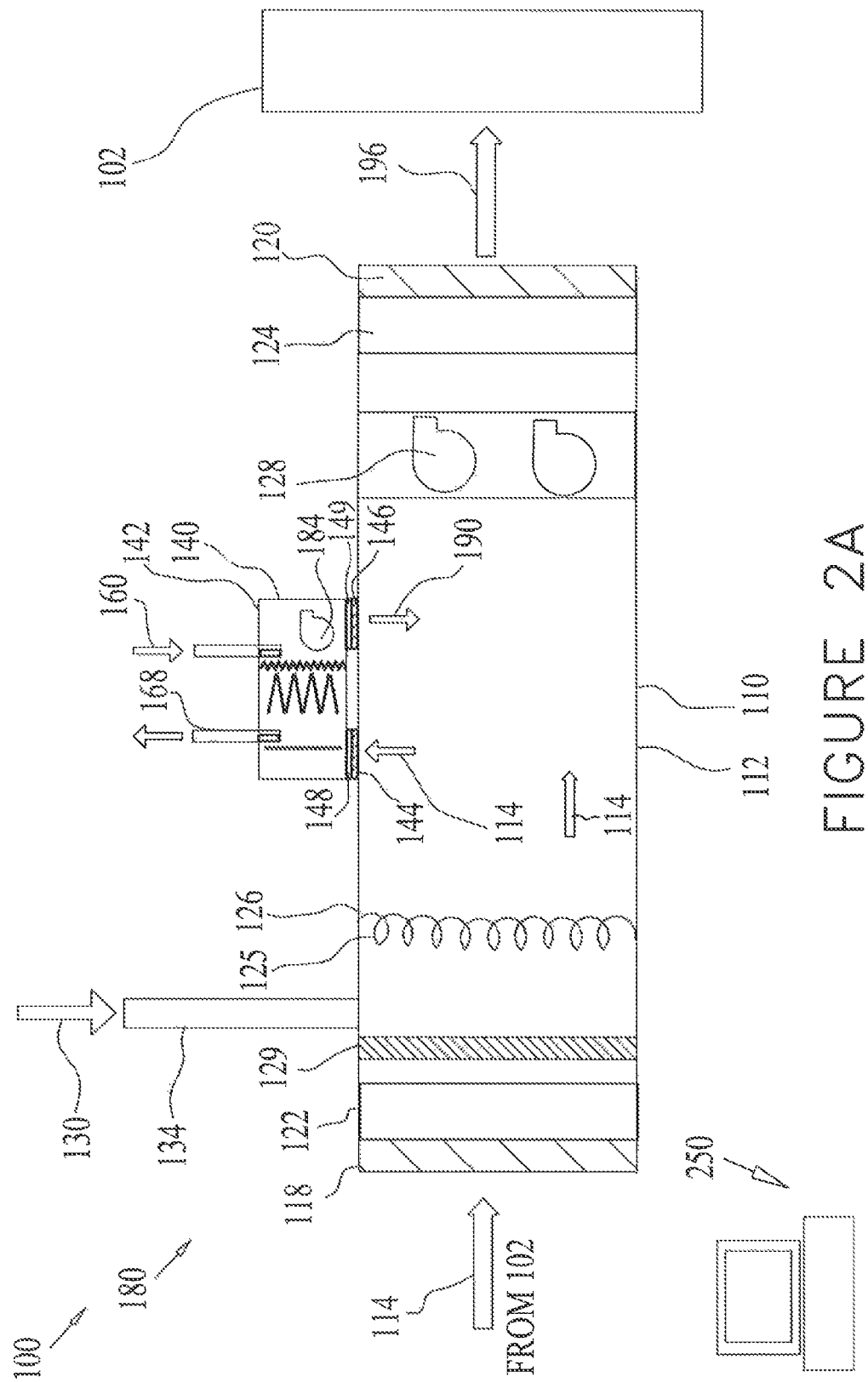
FIGS. 2A and 2B are each a schematic illustration of an air management system comprising an air treatment assembly according to another embodiment of the present disclosure.
Figure 2B:
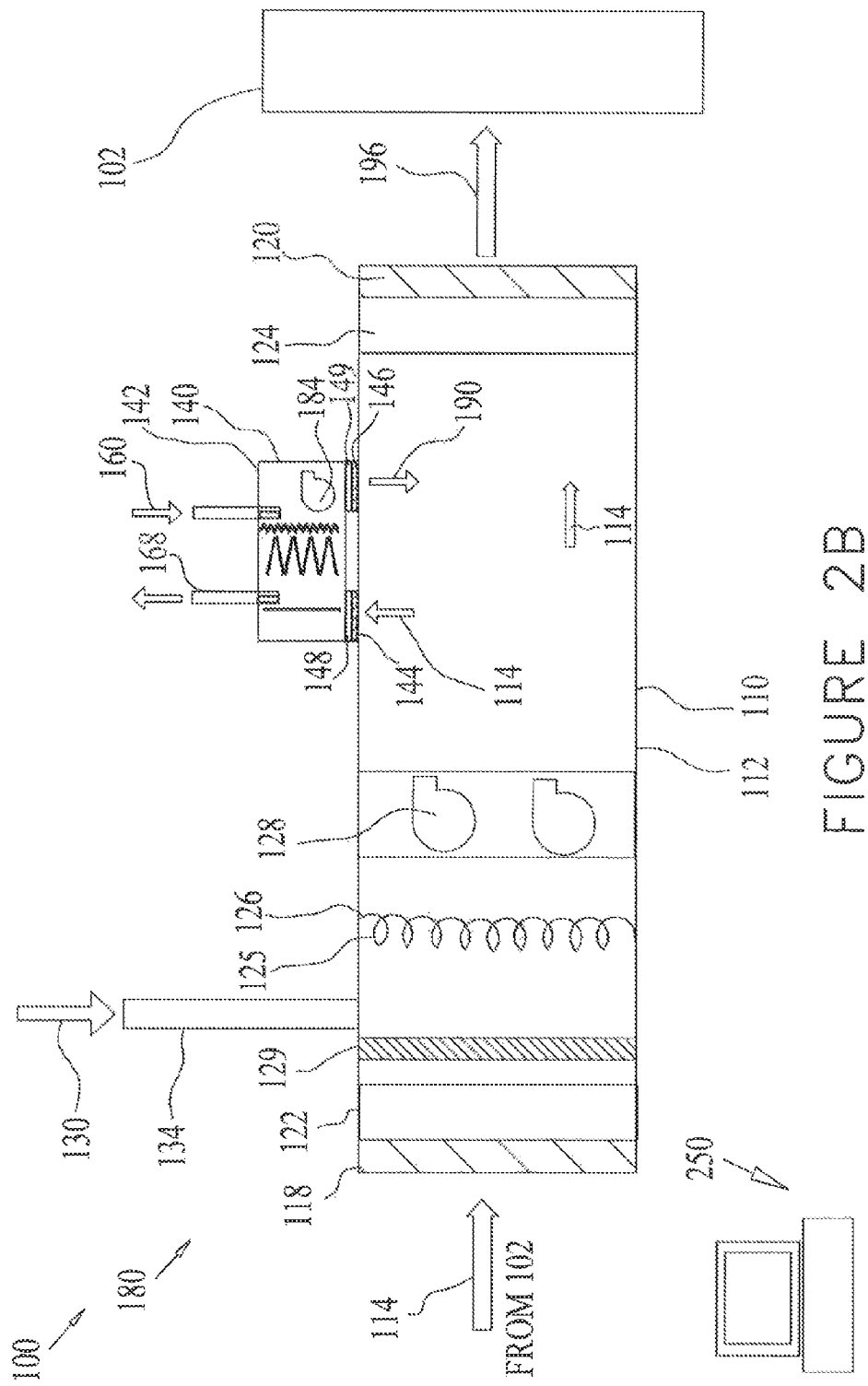

In FIGS. 2A and 2B the integrated system 180 is configured with a forward topology and airflow patterns similar to the integrated system 180 of FIGS. 1A and 1B. In FIGS. 2A and 2B the intake 144 and feed 146 are downstream from the conditioning element 125. In FIG. 2A, the intake 144 and feed 146 are both intermediate the conditioning element 125 and the fan units 128. In FIG. 2B, the intake 144 and feed 146 are both downstream the fan unit 128. The integrated system 180 of FIGS. 2A and 2B is relatively simple to implement. Additionally, according to some embodiments, integrating the ATA 140 with the AHU 110 provides the additional advantage of the indoor air 114 flowing into the ATA 140 following cooling by conditioning element 125. In some embodiments, flowing relatively cool air over adsorbent materials, which are configured to adsorb contaminants more efficiently at relatively lower temperatures, improves the efficiency or capacity of contaminant adsorption by the ATA 140.

Examples of adsorbent materials that adsorb more efficiently at relatively lower temperatures may be, inter alia, activated charcoal, zeolites and some amines.

In some embodiments, a forward topology may be operable with the booster fan 184 to force airflow through the ATA 140, as there will not be an appreciable forward pressure drop between the intake 144 and the feed 146. Providing the booster fan 184 does not reduce the supply air throughput or change the requirements of the fan units 128.

Figure 3B:
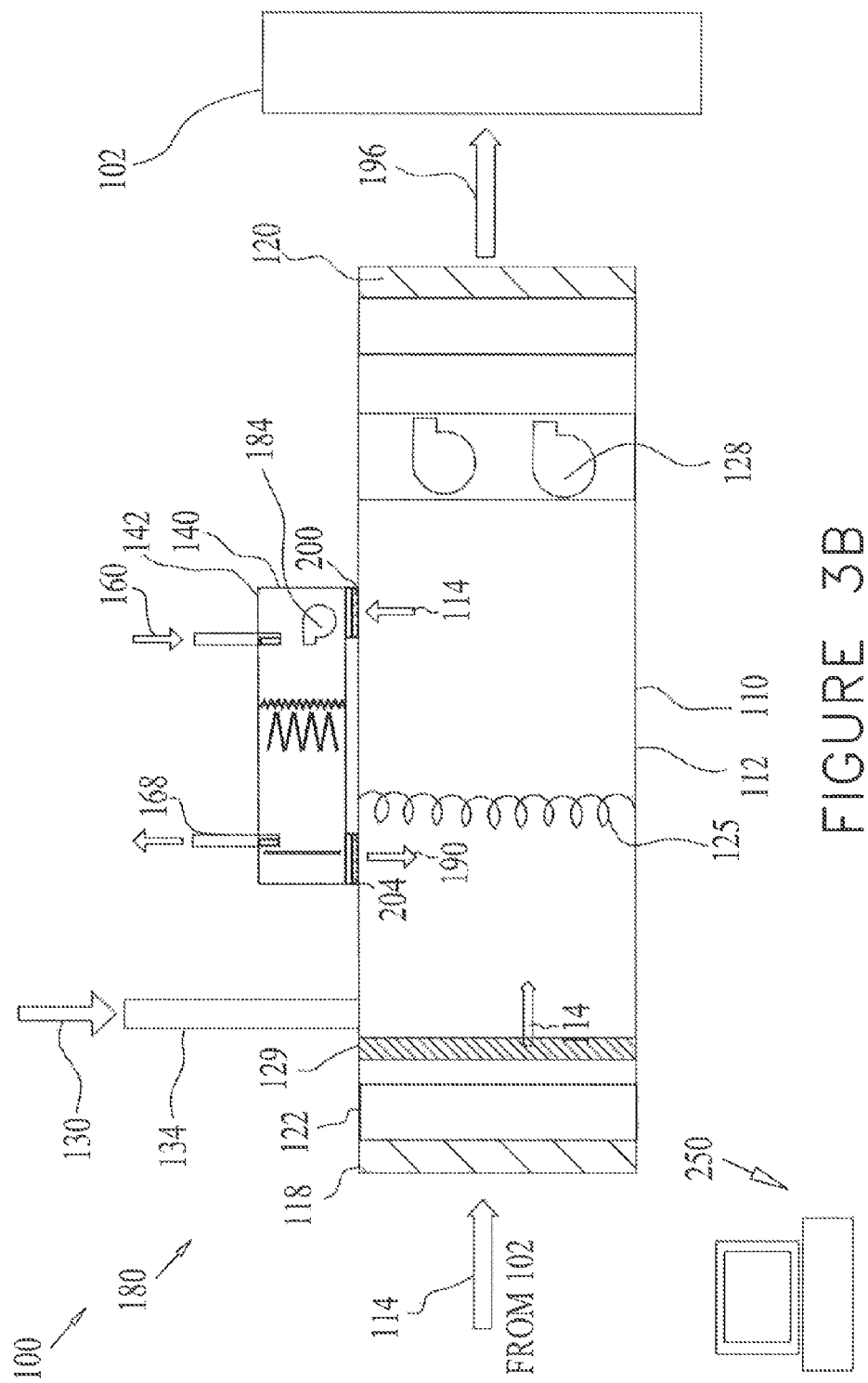
Figure 3C:
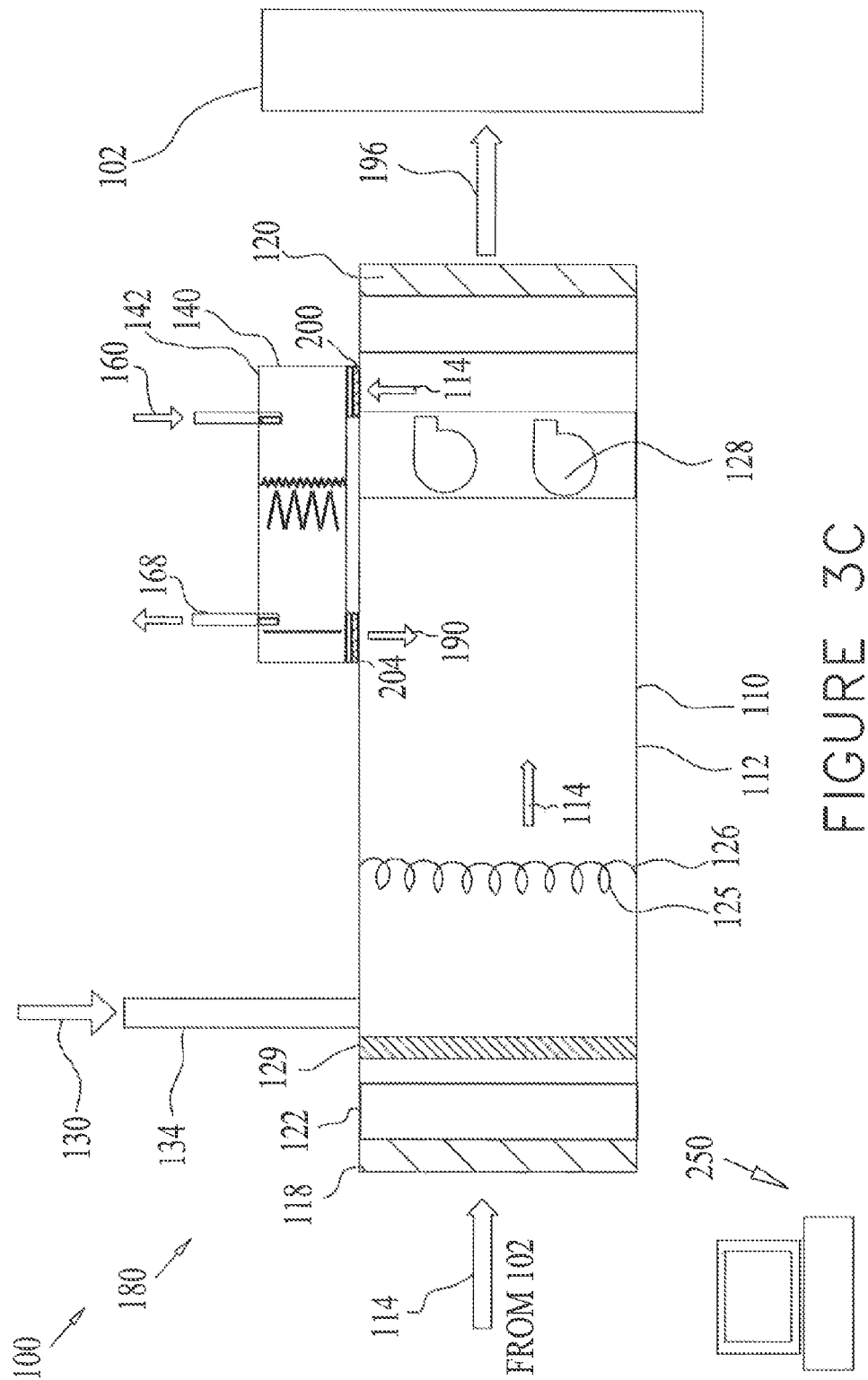

FIGS. 3A, 3B and 3C illustrate reverse topologies according to some embodiments. In FIG. 3A, an intake 200 is downstream from the conditioning element 125 and the fan unit 128, and a feed 204 is upstream the conditioning element 125. In FIG. 3A, the indoor air 114 flowing from AHU indoor air inlet 118 flows through conditioning element 125 and is cooled thereby. The cooled air enters the ATA 140 via intake 200 and is scrubbed therein. Treated air 190 flows out of the feed 204 and once again flows through the conditioning element 125 for further cooling thereby. The treated air 190 flows thereon to fan units 128. In this configuration, the indoor air 114 introduced into the ATA 140 is relatively colder air and with higher pressure than the indoor air 114 entering the AHU 110 at the AHU indoor air inlet 118. In some embodiments, flowing relatively cool air over adsorbent materials, which are configured to adsorb contaminants more efficiently at relatively lower temperatures, improves the efficiency or capacity of contaminant adsorption by the ATA 140. In some embodiments, the high input pressure of the indoor air at intake 200 may eliminate the need for the separate, dedicated ATA booster fan 184 inside the ATA 140, since the fans units 128 may be sufficient for urging indoor air 114 into the intake 200. Thus the ATA 140 of the integrated system 180 of FIG. 3A utilizes the components of the AHU 110 for operation thereof.

In some embodiments, the treated air 190 may be returned upstream from the conditioning element 125, assuring that the treated air 190, which may have been heated during the treatment process, is cooled before entering the enclosed environment 102.

Thus, the integrated system 180 may be configured to direct the treated air 190 to the conditioning element 125 yet again for further cooling thereof, such as shown in FIG. 3A. Thereby introducing cooled supply air 196 into the enclosed environment 102 without investing additional energy or requiring additional components.

In the embodiment of FIG. 3B the intake 200 may be between the conditioning element 125 and the fan unit 128, whereas the feed 204 is upstream from the conditioning element 125. In this embodiment, the indoor air 114 is cooled air and may require the additional booster fan 184 to urge air through the adsorbent material of the ATA 140. Here too, as in FIG. 3A the treated air 190 passes through the conditioning element 125 before being supplied to the enclosed environment 102.

In the embodiment of FIG. 3C, the intake 200 is downstream the fan unit 128 and the feed 204 is intermediate the conditioning element 125 and the fan unit 128. In this configuration, the indoor air 114 introduced into the ATA 140 is relatively colder air and with higher pressure than the indoor air 114 entering the AHU 110 at the AHU indoor air inlet 118. In some embodiments, flowing relatively cool air over adsorbent materials, which are configured to adsorb contaminants more efficiently at relatively lower temperatures, improves the efficiency of contaminant adsorption by the ATA 140. In some embodiments the high input pressure of the indoor air at intake 200 may eliminate the need for the separate, dedicated ATA booster fan 184 inside the ATA 140, since the fans units 128 may be sufficient for urging indoor air 114 into the intake 200. Thus, the ATA 140 of the integrated system 180 of FIG. 3C utilizes the components of the AHU 110 for operation thereof.

The integrated system 180 of FIGS. 3A-3C is relatively simple to implement. Additionally, the reverse topology of the integrated system 180 of FIGS. 3A-3C allows the indoor air 114 to be first cooled by conditioning element 125 prior to entering the ATA 140, which increases the adsorbent efficiencies of some adsorbent materials, as described above.

Additionally, the embodiments of the integrated system 180 of FIGS. 3A and 3B allows the indoor 114 to be first cooled by the conditioning element 125 during flow from the AHU indoor air inlet 118 to intake 200 and again to be cooled during flow from the feed 204 to the AHU indoor air outlet 120. Thus it is seen that the integrated system 180 of FIGS. 3A and 3B is configured to efficiently provide cool supply air 196 to the enclosed environment.

FIG. 4 illustrates a generally similar configuration to that of FIG. 3A. FIG. 4 illustrates an embodiment where the air management system 100 is a packaged central air conditioning system. The integrated system 180 comprises the ATA 140 mounted on an AHU 110 configured as a packaged rooftop unit (PU) 218. A compressor and a condenser unit 220 may be located at the end of the PU 218, as shown in FIG. 4, though it is understood that the compressor and a condenser unit 220 can be positioned in other adjacent locations. The compressor and a condenser unit 220 may be in fluid communication with the cooling or heating coils 126 of the PU 218. As noted before, heat generated by the condenser of the compressor and a condenser unit 220 could be harvested to heat the outdoor air 160 in regeneration mode.

Thus, it can be seen that the components of the PU 218 of FIG. 4 may be utilized to efficiently regenerate the adsorbent material of the ATA 140.

It is apparent that features described in reference to FIGS. 1A-3C or any other variations may be implemented in the embodiment of the integrated system 180 of FIG. 4. In some embodiments the air management system 100 may comprise a central air conditioning system (CACS) having a heat pump or compressor. The integrated system 180 may comprise the ATA 140 and the AHU 110, which comprises a part of the CACS. In some embodiments the purge gas, e.g. outdoor air 160 may be directly or indirectly heated by the condenser of the heat pump that provides refrigerant for the air management system 100.

In some embodiments, a controller 250 may be provided to control the operation of the integrated system 180 of FIGS. 1A-4. In some embodiments, the controller 250 may be configured to control the operation of the air management system 100 between at least the scrubbing mode, wherein gaseous contaminants contained within the indoor airflow are adsorbed by the adsorbent material, and the regeneration mode, wherein the purging airflow is directed over and/or through the adsorbent material to release gaseous contaminants previously adsorbed by the adsorbent material.

In some embodiments, the electronic and control functions provided in a standard AHU 110 may be utilized for providing electronic and control functions to the ATA 140. In some embodiments, there may be provided computer instructions operational on the controller 250 to cause the controller 250 to control operation of at least the scrubbing mode and the regeneration mode.

In some embodiments, the air management system 100 may comprise air quality sensors, including but not limited to $CO_2$ sensors, VOC sensors, and particle meters (not shown). In some embodiments, the sensors may be positioned to monitor the air quality of the indoor air 114 and the supply air 196. In some embodiments, the sensors measure the ATA 140 air entering the intake and exiting the feed, for monitoring the necessity and the performance of the ATA 140. If the intake air meets certain quality requirements, the ATA 140 may be shut down temporarily. Alternatively, if the feed air is not sufficiently clean, an alert can be generated for inspection and service.

In some embodiments, AHUs are configured to intake fresh air 130 from the outside, for supplementing the indoor air 114. The amount of incoming fresh air 130 may be influenced in part by dampers (such as indoor air inlet damper 122) which can be controlled manually or electronically by the controller 250. An AHU 110 or PU 218 with a built-in, integrated ATA 140 can use less fresh air to maintain desired air quality. Furthermore the amount of fresh air used can be controlled by algorithms that optimize the tradeoff between fresh air and scrubbing, depending on measured air quality, outside conditions, and the energy requirements of the air treatment subassembly.

It is appreciated that the ATA 140 shown in FIGS. 1B-4 may be placed within the AHU 110 or PU 218, as shown in FIG. 1A.

In some embodiments, the integrated system 180 may comprise the ATA 140 integrated with an air handler located within a distributed air circulation system, such as a fan-coil system. Additionally the ATA 140 may be integrated in a fan-coil unit.

In some embodiments, the intake 144 or 200 may be positioned at a sufficient distance from the feed 146 or 204 so as to prevent the urging of air into the feed 146 or 204 rather than into the intake 144 or 200. In some embodiments, the ATA 140 may be insulated so as to prevent undesired thermal exchange between the ATA 140 and the AHU 110.

It is noted in reference to FIGS. 1A-4, that any suitable means, such as blowers, dampers, valves, fans or shutters, may be used to control the volume of air entering and/or exiting the integrated system 180 or any other component of the air management system 100.

In some embodiments, there may be provided a non-transitory computer readable medium having stored thereon for performing the method for circulating air in an enclosed environment. The method may comprise directing an indoor airflow to the indoor air inlet 118 of the AHU 110. The AHU 110 may include the indoor air inlet 118 to receive the indoor airflow 114 from the enclosed environment 102 and the indoor air outlet 120 to expel the indoor airflow. In some embodiments, during a scrubbing cycle, the method may comprise intercepting a portion of the indoor airflow 114 received by the indoor air inlet 118 of the AHU 110 and directing the intercepted indoor airflow to the indoor air inlet 144 of the ATA 140 arranged proximate the AHU 110. The ATA 140 may include the indoor air inlet 144 configured to intercept a portion of the indoor airflow received by the AHU indoor air inlet 118, a regenerable adsorbent material configured to treat the intercepted indoor airflow by adsorbing at least one gaseous contaminant contained in the intercepted indoor airflow, and an indoor air outlet 146 for expelling the intercepted indoor airflow treated by the adsorbent material. In some embodiments the method may further comprise flowing the intercepted indoor airflow over and/or through the adsorbent material to adsorb at least one gaseous contaminant, directing the treated intercepted indoor airflow 190 to the outlet 146 of the ATA 140. During the regeneration cycle, the method may comprise directing a purging airflow to the ATA 140 and flowing the purging airflow over and/or through the adsorbent material to release gaseous contaminants previously adsorbed by the adsorbent material, so as to regenerate the adsorbent material.

Since air management systems 100 are utilized at times in limited spaces, such as mechanical rooms, basements, plenums and attics, reduction in size of components of the air management system 100 yields functional and commercial superiority. Even on an open rooftop space economy can be important, especially with regard to available and usable footprint or floor space area. The integrated system 180, according to some embodiments, combines the AHU 110 and ATA 140 into a single unit and further eliminates the need for ducts or conduits therebetween. This results in a significantly reduced size system. In a non-limiting example, the total floor space occupied by AHU 110 and ATA 140 and ducts therebetween is about 175 square feet. The total floor space of the integrated system 180 is about 150 square feet. In a smaller AHU the relative space savings is even larger.

The reduced size integrated system 180 may be installed in small areas, where a standard AHU 110 and separate ATA 140 would otherwise be cumbersome or impossible to contain.

The integrated system 180 may be configured for further reduction in size by eliminating components required in a standard AHU 110 and separate ATA 140 configuration. For example, as shown in FIGS. 3A and 3C, placement of the ATA indoor air inlet 144 upstream and in proximity to the fan units 128 of the AHU 110 allows elimination of the booster fan 184, while still directing the indoor air 114 into the ATA 140. Additionally, as shown in FIG. 4, exploitation of an already existing condenser of the condenser unit 220 for heating the outdoor air 160 eliminates the need to provide additional heating components. This is easier to achieve when the system is configured for this purpose, in other words an integrated system 180 of AHU and ATA.

A skilled artisan will appreciate that reduction in the energy required to operate the air management system 100 yields functional and commercial superiority. In some embodiments, the integrated system 180, by virtue of combining both the AHU 110 and the ATA 140 in a single unit, enables exploitation of the already existing components of the AHU 110 for efficiently treating the indoor air within the ATA 140. For example, as shown in FIGS. 3A and 3C, and described above, the indoor air 114 may be directed into the ATA 140 by AHU fan units 128 without requiring the operation and control of the booster fan 184. Additionally, as shown in FIG. 4, exploitation of the already existing condenser of the condenser unit 220 for heating the outdoor air 160 eliminates the need to provide additional heating components and providing energy for the operation thereof. Similarly, the same heat pump that provides refrigerant for the AHU 110 may be used to heat the outdoor air 160.

Figure 5:
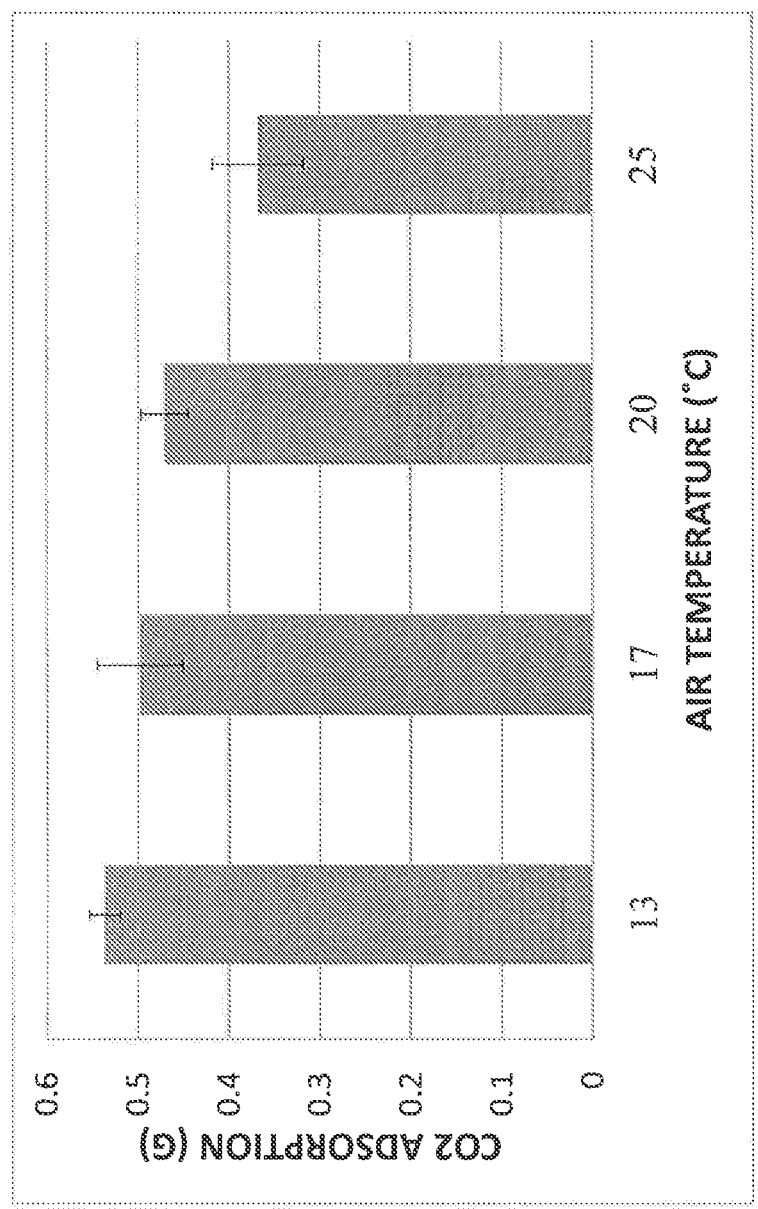
FIG. 5 shows an example graph illustrating an increase in adsorbent efficiency as a result of a decrease in the temperature of air flowing through the adsorbents.

Moreover, in the art of air management it is recognized that a system which provides the desired air quality with using the least amount of energy is superior. It is known in the art that the adsorption efficiency of some adsorbent materials significantly increases by flowing indoor air 114 at a lower temperature than the indoor air 114 flowing from the enclosed environment 102. In the standard AHU 110 and separate ATA 140 cooling the indoor air flowing into the ATA, the air reaching the ATA could be warmer than desired for good adsorbency. The air would have to pass through a conduit with imperfect insulation. In certain AHUs it would be difficult to draw colder air from the side of the supply air. The integrated system 180, by virtue of combining both the AHU 110 and the ATA 140 in a single unit, eliminates the ducts, and in some embodiments enables configuring a flow path which cools the indoor air flowing into the ATA 140, without any additional cooling unit or any investment of energy for operation of the cooling unit. For example, as seen in FIGS. 2A-4, the indoor air 114 is first cooled by the already existing conditioning element 125 of the AHU 110 thereby entering the ATA 140 at a reduced temperature. The adsorption efficiency significantly increases without requiring any additional investment of energy. The increase in adsorption efficiency to the indoor air 114 cooling is shown in FIG. 5 and described in the following example.

The example as set forth herein is meant to exemplify some of the various aspects of carrying out the disclosure subject matter and is not intended to limit the disclosure in any way.

EXAMPLE

A circular cartridge of a diameter of 10 centimeters and a depth of 2.5 cm was filled with approximately 200 grams of bentonite-diethanolamine composite and was placed in an airflow measurement apparatus with a temperature control component. Air was introduced into the apparatus at a face velocity of 10 cm/sec at 25° C. containing a $CO_2$ concentration of 875 ppm. The air was cooled to a temperature of 13° C. The cartridge was exposed to the air flow at 13° C. through the entire cross section of the cartridge. The weight of the cartridge was measured prior to inflow of air and following flow of air through the cartridge. The increase in weight was found to be 0.56866 grams.

The above experiment was repeated. This time the air was cooled to a temperature of 17° C. The cartridge was exposed to the air flow at 17° C. through the entire cross section of the cartridge. The weight of the cartridge was measured prior to inflow of air and following flow of air through the cartridge. The increase in weight was found to be 0.498 grams.

The above experiment was again repeated. This time the air was cooled to a temperature of 20° C. The cartridge was exposed to the air flow at 20° C. through the entire cross section of the cartridge. The weight of the cartridge was measured prior to inflow of air and following flow of air through the cartridge. The increase in weight was found to be 0.471 grams.

The above experiment was again repeated. This time the air remained at a temperature of 25° C. The cartridge was exposed to the air flow at 25° C. through the entire cross section of the cartridge. The weight of the cartridge was measured prior to inflow of air and following flow of air through the cartridge. The increase in weight was found to be 0.368 grams.

Analysis:

Comparing the weight increase of the cartridge with inflow of air at different temperatures shows that as the air flowing through the cartridge is cooler the adsorbent efficiency increases, as shown in the graph of FIG. 5. The reduction of the air temperature from 25° C. to 13° C. resulted in an increase of about 45% in adsorption capacity. Looking at the results for 20° C. as compared to 25° C., it is observed that a 28% increase is associated with the 5° C. temperature difference, suggesting that even small changes in temperature, such as one degree centigrade, are impactful.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 250, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure).

What is claimed is:

1. An air management system for circulating air in an enclosed environment, comprising:
   an air handling unit (AHU), the AHU including an indoor air inlet to receive an indoor airflow from the enclosed environment and an indoor air outlet to expel the indoor airflow;
   a conditioning element arranged between the inlet and the outlet configured to at least heat or cool the indoor airflow as it flows thereover;
   one or more fan units arranged between the inlet and the outlet configured to provide velocity to the indoor airflow; and
   an air treatment assembly (ATA) arranged within or proximate the AHU, the ATA including an air inlet configured to receive a portion of the indoor airflow received by the AHU indoor air inlet, a regenerable adsorbent material configured to treat the received indoor airflow by adsorbing at least one gaseous contaminant contained in the received indoor airflow, and an outlet for expelling the air treated by the adsorbent material back into the AHU,
   wherein the ATA includes an outdoor air inlet and an outdoor air outlet.

2. The system according to claim 1, wherein the ATA inlet and ATA outlet are arranged downstream from the conditioning element.

3. The system according to claim 1, wherein the one or more fans are located downstream from the conditioning element, the ATA inlet is arranged downstream from the AHU inlet, and the ATA outlet is arranged downstream from the ATA inlet and upstream from the conditioning element.

4. The system according to claim 1, wherein the one or more fans are located downstream from the conditioning element, the ATA inlet is arranged downstream from the one or more fans, and the ATA outlet is arranged downstream from the ATA inlet.

5. The system according to claim 1, wherein the one or more fans are located downstream from the conditioning element, the ATA outlet is arranged downstream from the AHU inlet and upstream from the conditioning element, and the ATA inlet is arranged downstream from the ATA outlet and downstream from the one or more fans.

6. The system according to claim 1, wherein the one or more fans are located downstream from the conditioning element, the ATA outlet is arranged upstream from the conditioning element, and the ATA inlet is arranged downstream from the conditioning element and upstream from the one or more fans.

7. The system according to claim 6 wherein the conditioning element is configured to receive the indoor airflow for cooling thereof prior to entering the ATA inlet.

8. The system according to claim 6 wherein the indoor air flows through the conditioning element prior to entering the ATA inlet and following exiting the ATA outlet the indoor air flows again through the conditioning element.

9. The system according to claim 6, wherein the ATA inlet is arranged upstream from the one or more fans.

10. The system according to claim 1, wherein the one or more fans are located downstream from the conditioning element, the ATA outlet is arranged upstream from the one or more fans and the ATA inlet is arranged downstream from the one or more fans.

11. The system according to claim 1 wherein the one or more fan units are configured to direct indoor airflow into the ATA without requiring a booster fan associated with the ATA.

12. The system according to claim 1, wherein the one or more fans are located downstream from the conditioning element, the ATA outlet is arranged upstream from the conditioning element and the ATA inlet is arranged downstream from the one or more fans.

13. The system according to claim 1, wherein the AHU includes a first housing and the ATA includes a second housing.

14. The system according to claim 13, wherein the second housing is arranged within the first housing.

15. The system according to claim 13, wherein the second housing is arranged outside the first housing.

16. The system according to claim 1, wherein the ATA includes a purging airflow inlet configured to direct a purging airflow over and/or through the adsorbent material, said purging airflow either directly or indirectly heated by at least one of, a heat pump, a gas furnace, solar heat, an electrical coil, and hot water.

17. The system according to claim 1, wherein the AHU comprises a condenser and a purging airflow configured to flow over and/or through the adsorbent material is either directly or indirectly heated by the condenser.

18. The system according to claim 1, wherein the at least one gaseous contaminant is selected from the group consisting of: carbon dioxide, volatile organic compounds, sulfur oxides, radon, nitrous oxides and carbon monoxide.

19. An air management system for circulating air in an enclosed environment, comprising:
   an air handling unit (AHU), the AHU including an indoor air inlet to receive an indoor airflow from the enclosed environment and an indoor air outlet to expel the indoor airflow;
   a conditioning element arranged between the inlet and the outlet configured to at least heat or cool the indoor airflow as it flows thereover;
   one or more fan units arranged between the inlet and the outlet configured to provide velocity to the indoor airflow; and
   an air treatment assembly (ATA) arranged within or proximate the AHU, the ATA including an air inlet configured to receive a portion of the indoor airflow received by the AHU indoor air inlet, a regenerable adsorbent material configured to treat the received indoor airflow by adsorbing at least one gaseous contaminant contained in the received indoor airflow, and an outlet for expelling the air treated by the adsorbent material back into the AHU, wherein the adsorbent material is contained within a cartridge configured to be removable from the ATA.

20. A method for circulating air in an enclosed environment, comprising:

provicing an air management system fix circulating air in the enclosed environment, the system comprising:

an air handling unit (AHU), the AHU including an indoor air inlet to receive an indoor airflow from the enclosed environment and an indoor air outlet to expel the indoor airflow;

a conditioning element arranged between the inlet and the outlet configured to at least heat or cool the indoor airflow as it flows thereover;

one or more fan units arranged between the inlet and the outlet configured to provide velocity to the indoor airflow; and an air treatment assembly (ATA) arranged within or proximate the AHU, the ATA including an air inlet configured w receive a portion of the indoor airflow, a regenerable adsorbent material configured to treat the received indoor airflow by adsorbing at least one gaseous contaminant contained in the received indoor airflow, and an outlet for expelling the received indoor airflow treated by the adsorbent material; and directing the indoor airflow to the indoor air inlet of the AHU;

cooling the indoor airflow by directing the indoor airflow to flow from the inlet of the AHU, over the conditioning element;

during a scrubbing cycle, receiving a portion of the cooled indoor airflow received by the indoor air inlet of the AHU and directing the received indoor airflow to the inlet of the ATA;

flowing the received indoor airflow over and/or through the adsorbent material to adsorb the at least one gaseous contaminant;

directing the treated received indoor airflow to the outlet of the ATA;

cooling the indoor airflow again by directing the indoor airflow to flow from the outlet of the ATA over the conditioning element;

during a regeneration cycle, directing a purging airflow to the ATA; and flowing the purging airflow over and/or through the adsorbent material to release the at least one gaseous contaminant previously adsorbed by the adsorbent material, so as to regenerate the adsorbent material.

* * * * *